US006810244B2

(12) United States Patent
Bristow et al.

(10) Patent No.: US 6,810,244 B2
(45) Date of Patent: Oct. 26, 2004

(54) METHOD FOR SYNTHESIZING MOBILE IDENTIFICATION NUMBERS

(75) Inventors: Steve Bristow, Los Altos Hills, CA (US); Sheldon Richard Bentley, San Francisco, CA (US)

(73) Assignee: Telcontar, San Jose, CA (US)

( * ) Notice: Subject to any disclaimer, the term of this patent is extended or adjusted under 35 U.S.C. 154(b) by 483 days.

(21) Appl. No.: 09/990,614

(22) Filed: Nov. 21, 2001

(65) Prior Publication Data

US 2002/0052190 A1 May 2, 2002

Related U.S. Application Data

(63) Continuation-in-part of application No. 09/837,738, filed on Apr. 16, 2001, and a continuation-in-part of application No. 09/547,272, filed on Apr. 11, 2000, now abandoned, and a continuation-in-part of application No. 09/547,270, filed on Apr. 11, 2000, and a continuation-in-part of application No. 09/347,389, filed on Jul. 6, 1999, now Pat. No. 6,529,723.

(51) Int. Cl.[7] .............................................. H04M 3/00
(52) U.S. Cl. ...................... 455/418; 455/419; 455/420; 455/405
(58) Field of Search ................................ 455/418, 419, 455/420, 405, 515; 340/825.22, 7.22, 7.23, 7.39, 7.41

(56) References Cited

U.S. PATENT DOCUMENTS

| 5,805,670 | A | | 9/1998 | Pons et al. ..................... 379/45 |
| 5,889,474 | A | | 3/1999 | LaDue .................. 340/825.49 |
| 6,044,265 | A | * | 3/2000 | Roach, Jr. ................... 455/419 |
| 6,088,431 | A | | 7/2000 | LaDue ........................ 379/114 |
| 6,144,859 | A | | 11/2000 | LaDue ........................ 455/511 |
| 6,157,825 | A | * | 12/2000 | Frederick .................... 455/410 |
| 6,211,782 | B1 | | 4/2001 | Sandelman et al. ......... 340/506 |
| 6,285,868 | B1 | | 9/2001 | LaDue ........................ 455/410 |
| 6,295,346 | B1 | | 9/2001 | Markowitz et al. ......... 379/127 |
| 6,542,730 | B1 | * | 4/2003 | Hosain ........................ 455/410 |
| 6,556,840 | B2 | * | 4/2003 | Zicker et al. ............... 455/551 |
| 6,594,576 | B2 | | 7/2003 | Fan et al. .................... 701/117 |
| 6,718,177 | B1 | * | 4/2004 | Comer et al. ............... 455/458 |

* cited by examiner

*Primary Examiner*—William Trost
*Assistant Examiner*—Danh C Le
(74) *Attorney, Agent, or Firm*—Bingham McCutchen LLP

(57) ABSTRACT

A method for adding functionality to a network system is provided. The method is particularly applicable to network systems that utilize a limited number of data packets, e.g., Mobile Identification Numbers (MINs), to send instructions between the network operations center and the individual devices coupled to the network operations center. The added functionality is achieved by assigning more than one function or possible response to at least some of the secondary MINs and allowing secondary MINs to be combined.

7 Claims, 6 Drawing Sheets

METHOD FOR SYNTHESIZING MOBILE IDENTIFICATION NUMBERS

CROSS-REFERENCES TO RELATED APPLICATIONS

This application is a continuation-in-part of U.S. patent application Ser. No. 09/347,389, filed Jul. 6, 1999 and now U.S. Pat. No. 6,529,723, Ser. No. 09/547,270 filed Apr. 11, 2000, Ser. No. 09/547,272 filed Apr. 11, 2000 and now abandoned, and Ser. No. 09/837,738 filed Apr. 16, 2001, the specifications of which are incorporated herein in their entirety for any and all purposes.

FIELD OF THE INVENTION

The present invention relates generally to systems for communicating via a wireless network to selected devices and, more particularly, to a method of synthesizing secondary Mobile Identification Numbers (MINs) for use in a communication system.

BACKGROUND OF THE INVENTION

A variety of different types of systems utilize a centralized communications to monitor, remotely operate, and otherwise communicate with remote devices. For example, many home and vehicle security systems use a variety of monitors (e.g., door, window, floor pressure, motion, sound, smoke detectors, etc.) that are coupled via a wireless network to a centralized office. In general, the centralized office is staffed around the clock so that when a critical event occurs (e.g., break-in, burglary, fire, etc.) the monitored event can be reported to the suitable parties (e.g., police department, fire department, property owner, etc.).

Unfortunately, there are a number of problems associated with typical monitoring systems. First, it can be difficult to continually update the monitoring service as conditions, such as contact information for the property owner, change. Not only can it be difficult to change such information, the information intake service personnel may make mistakes, leading to the service being unable to locate the property owner in an emergency. Second, the monitoring personnel can make mistakes with respect to a reported incident, for example not noting the occurrence of an event, improperly reporting or delaying the reporting of the event, etc.

For a variety of reasons, typically the problems associated with centralized and staffed monitoring services are more severe in vehicle monitoring systems. First, it is generally more important to notify the user in the case of a monitored vehicle alarm than it is for a home alarm since there is a higher likelihood of receiving a false, and easily corrected, alarm in the former case. Accordingly, the ability to easily and reliably update contact information becomes more critical for vehicle monitoring systems. Second, the user is more likely to wish to remotely and periodically determine the status of their car (e.g., in motion, travel speed, location, door/window conditions, etc.) than their home, thus requiring a simpler, user-friendlier interface than that associated with a staffed operations center. Third, the delay inherent in a staffed monitoring system is particularly problematic with respect to vehicles due to their inherent mobility, and thus the speed by which they can be vandalized and/or stolen. Fourth, the user is more likely to wish to alter the monitoring conditions associated with their car than those associated with their home, adding to the desire for an easier and more reliable interface. Fifth, the costs associated with a staffed monitoring system are typically too excessive to allow the level of control and monitoring that may be desired by the vehicle's owner.

One solution to the afore-mentioned problems is an automated system that allows the user to communicate with, receive information from, and otherwise control a remotely located device without requiring any interaction or interference from system personnel. Such an automated system can utilize any of a variety of communication networks, although preferably a wireless, bi-directional network is used. An example of such a network is that provided by Aeris.net™.

In a network system such as the Aeris.net™ system, data packets are sent over standard cellular control channels, thereby bypassing the voice channel. There are two types of control channels and message types: Forward Control Channels (FOCC) or downstream messages and Reverse Control Channels (RECC) or upstream messages. FOCC or downstream messages utilize data packets comprised of Mobile Identification Numbers (MINs). A typical network system is designed to support a limited number of MINs per device. For example, the Aeris.net™ system supports a total of 11 MINs per device, a primary MIN and 10 secondary MINs. The secondary MINs, each of which identifies a specific remote device, can be used to elicit various functions from the identified remote device. As one of the secondary MINs is reserved for use by the network and the cellular system operator, there are a total of 9 secondary MINs available for use in such a system.

Although 9 secondary MINs are sufficient for many applications, some monitoring systems would benefit from the added functionality offered by additional secondary MINs. Unfortunately, increasing the number of offered secondary MINs would significantly impact the design and cost of the network system.

Accordingly, what is needed in the art is a method for adding functionality to a system utilizing a limited number of data packets per device, e.g., secondary MINs. The present invention provides such a system.

SUMMARY OF THE INVENTION

The present invention provides a method for adding functionality to a network system, specifically one that utilizes a limited number of data packets, e.g., Mobile Identification Numbers (MINs), to send instructions between the network operations center and the individual devices coupled to the network operations center. The added functionality is achieved by assigning more than one function or possible response to at least some of the secondary MINs and allowing secondary MINs to be combined.

In at least one embodiment of the invention, one or more secondary MINs are defined to be Command Sequence Triggers or CSTs. During use, when a remote device receives a non-CST secondary MIN, it immediately responds according to the pre-assigned instruction for the received non-CST secondary MIN. If, however, the remote device receives a CST secondary MIN, it initiates a timer rather than immediately responding. If another secondary MIN is received within a pre-defined period of time, the remote device responds on the basis of the combination of the first and second secondary MINs. If another secondary MIN is not received within the pre-defined time period, the remote device responds on the basis of the single CST secondary MIN. Thus the CST secondary MIN is given, in this embodiment, two different meanings depending upon whether or not it is combined with another secondary MIN.

In at least one other embodiment of the invention, the system is programmed to allow the receipt of more than one CST secondary MIN. Thus if the remote device receives a first CST secondary MIN and then receives a second CST secondary MIN within the pre-defined time period, it does not respond immediately, rather it waits to determine if a third secondary MIN follows the second secondary MIN. If a third secondary MIN is received within the pre-defined time period, the remote device determines the pre-assigned response which corresponds to the combination and sequence of the first, second and third secondary MINs. The system can be configured to allow a maximum number of iterations or to allow an unlimited number of iterations. The system can also be configured to either require a predetermined number of secondary MINs in order to respond or to simply respond on the basis of the total number of received secondary MINs, the total number based only on secondary MINs received within the pre-allotted time periods.

In at least one other embodiment of the invention, CST secondary MINs cannot be combined with non-CST secondary MINs. Preferably in this embodiment the total number of CST secondary MINs that can be accepted by the remote device is limited. Also preferably in this embodiment a minimum number of CST secondary MINs must be received prior to the remote device responding. Alternately, rather than requiring a minimum number of CST secondary MINs, the remote device can be configured to respond on the basis of the CST secondary MINs received during the allotted time period.

In at least one other embodiment of the invention, every secondary MIN is treated as a CST secondary MIN. Accordingly, after receipt of a first secondary MIN, the remote device initiates a timer. If a second secondary MIN is not received within a pre-allotted time period, the remote device responds on the basis of the first secondary MIN. If a second secondary MIN is received within the pre-allotted time period, depending upon the configuration of the system, the remote device either responds on the basis of the combination of the first and second secondary MINs or it re-initiates the timer and again waits for the receipt of another secondary MIN. In order to control the response time, preferably this embodiment is limited to the receipt of two secondary MINs, i.e., a first and a second secondary MIN, thus allowing the remote device to respond immediately upon receipt of the second secondary MIN.

A further understanding of the nature and advantages of the present invention may be realized by reference to the remaining portions of the specification and the drawings.

DESCRIPTION OF THE SPECIFIC EMBODIMENTS

Figure 1:
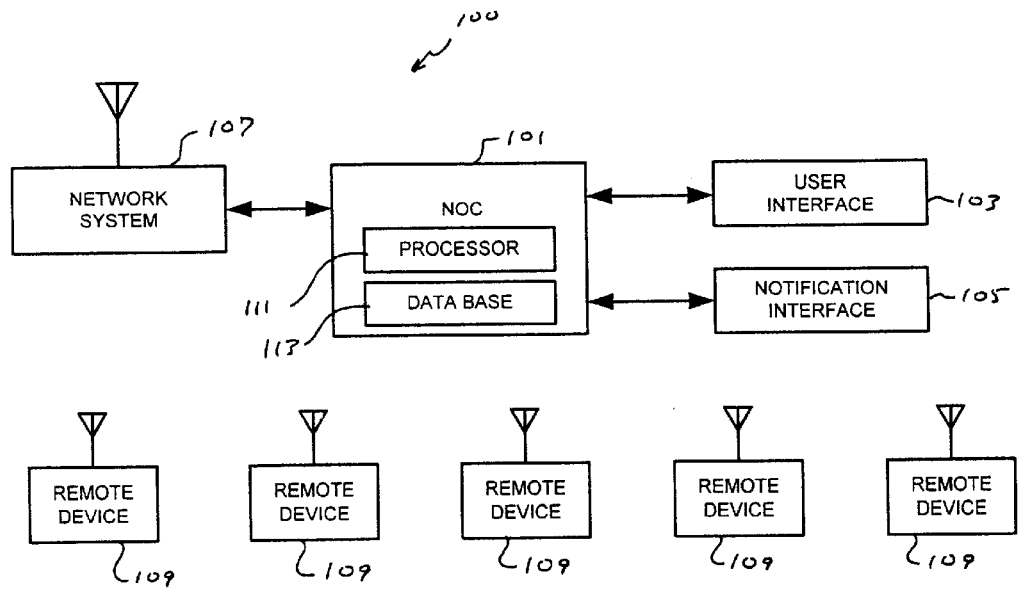
FIG. 1 is an illustration of an embodiment of an automated user notification system constructed in accordance with the present invention.

FIG. 1 is an illustration of an embodiment of an automated user notification system 100 constructed in accordance with the present invention. User notification system 100 is comprised of a network operations center (NOC) 101, a user interface 103 and a notification interface 105. NOC 101 is coupled to a communication network system 107, preferably a bi-directional communication network, and more preferably a commercial bi-directional communication network such as that provide by Aeris.net™. NOC 101, via network 107, communicates with a plurality of remote devices 109. Preferably network 107 provides wireless communication to devices 109 although it is understood that either some or all of the remote devices 109 can be coupled to NOC 101 via a wired network.

NOC 101 is comprised of a processor 111 and a database 113. Processor 111 controls the functionality of NOC 101, as further outlined below, and may be comprised of a single processor or multiple processors. Multiple processors may be used to provide system redundancy, to interface with the desired number of remote devices 109, and/or to provide dedicated functionality (e.g., responding to user requests, responding to sensor alerts, billing customers, etc.). Database 113 includes a user database, billing information, response codes and instructions, etc. and is preferably comprised of both volatile and non-volatile memory.

Figure 2:
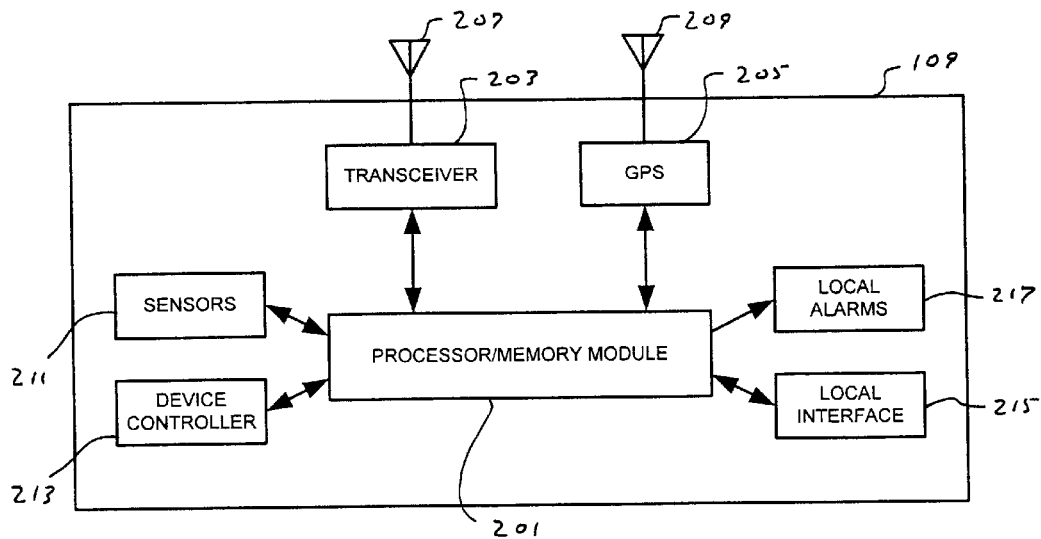
FIG. 2 is an illustration of one embodiment of a remote device in accordance with the present invention.

FIG. 2 is an illustration of one embodiment of remote device 109. It is understood that system 100 can be comprised of a plurality of identical or non-identical devices 109, non-identical devices 109 allowing for variations between devices 109 in order to account for user needs, device location, device mounting configuration, sensor type and number, desired device complexity, user interface options, remote functionality, network communications, etc. It is understood that each device 109 is attached to a specific, uniquely identifiable vehicle or other property, or a uniquely identifiable portion of a larger article.

Regardless of the type or desired functionality of device 109, each such device includes a controller 201, typically comprised of a processor and a memory module, and a transceiver 203 that allows device 109 to communicate via network 107 with NOC 101. In the preferred embodiment of the invention, and assuming that device 109 is coupled to a vehicle (e.g., car, boat, plane, motorbike, etc.) or other relatively mobile apparatus, the device also includes a global positioning system (GPS) module 205. In general, transceiver 203 and GPS module 205 will utilize separate antennae, 207 and 209 respectfully, although it will be appreciated that both modules can utilize a single antenna.

In the preferred embodiment, device 109 includes one or more sensors 211 which can sense a variety of conditions relating to the vehicle to which it is attached. For example, sensors 211 may include motion sensors, door sensors (e.g., door opened/closed), door lock sensors, window sensors (e.g., window opened/closed), car roof status (e.g., convertible up/down, sun-roof opened/closed), light sensors (e.g., lights on/off), engine status sensors, speed sensors, occupant sensors (e.g., pressure sensors located within the vehicles seats), etc. Sensors 211 may also utilize an Intelligent Data Base or IDB. The IDB is a peer to peer data network available for use in automotive devices and other ground vehicles which has access to important vehicle systems, such as the vehicle's electrical system and components. Sensors 211 may also utilize an On-Board Diagnostic system or OBD. The OBD system provides a means of diagnosing engine problems and controlling engine functions.

In the preferred embodiment, device 109 includes one or more device controllers 213. Controllers 213 can be used to control various functions of the systems to which they are attached. For example, controllers 213 can be used to remotely lock/unlock doors, close/open windows, close/open convertible top, close/open sun-roof, turn on/off lights, enable/disable engine, enable/disable ignition switch, activate a cellular phone within the passenger compartment of the vehicle, etc.

In at least one embodiment of the invention, device 109 includes a local interface 215. Local interface 215 is preferably comprised of a keypad or other switching means. Additionally, local interface 215 preferably includes one or more indicators, visual, audible, or both. Local interface 215 can be used to control the status of device 109 (e.g., on/off), allow for local emergency activation (e.g., panic switch), and/or allow for direct user/NOC communications (e.g., for user requested directions, addresses, telephone numbers, etc.).

In at least one embodiment of the invention, device 109 includes one or more localized alarms 217 which can be activated prior to, simultaneously with, or after a notification alert or other message is sent to NOC 101 by device 109. Alarms 217 can include a separate horn or other sounding device or alarm 217 can simply activate the vehicle's horn. Additionally, alarms 217 can include a relay switch coupled to the lights, thus allowing for the activation of some or all of the vehicle's lights, either continuously or intermittently.

Device 109 can interact with NOC 101 in a variety of ways and in response to a variety of conditions. Once notified of a specific condition, NOC 101 can notify the user, police, fire department, paramedics, or other parties based on the preprogrammed notification instructions contained within NOC 101. Additionally, NOC 101 can be configured to send a response directly to device 109 (e.g., disable engine, honk horn, flash lights, lock doors, determine and send position coordinates, etc.). A few examples of system operational modes are provided below although it will be appreciated that these are only meant as examples and that there are other uses for the disclosed system.

Alarm mode: Preferably system 100 is configured to provide alarm functionality. Specifically, device 109 is preferably configured to notify NOC 101 whenever there is an occurrence of a predetermined alarm event (e.g., vehicle break-in, vehicle movement, fire, etc.). Sensors 211 detect the alarm event, for example by monitoring the condition of the doors, windows, engine, ignition switch, seat pressure, vehicle movement (e.g., speed or positional changes), engine tachometer, smoke detectors, $CO_2$ detectors, etc.

Notification mode: System 100 can be configured to notify NOC 101 upon the occurrence of a specific condition. For example, the user may set-up the system to send a notification message whenever the vehicle exceeds a predetermined speed or leaves a predetermined geographic region. Alternately, the system can be configured to send a response immediately upon the occurrence of the specified condition. For example, if device 109 includes an external rain sensor, when rain is sensed and NOC 101 is notified of the rain, the system can automatically direct device 109 to close all vehicle windows, convertible top, sun-roof, etc. Alternately, the system can be configured to send a response to the local system and notify the user immediately upon the occurrence of the specified condition. For example, if a sensor within device 109 determines that the vehicle to which device 109 is attached is exceeding a predetermined speed, the system can notify the user and also direct device 109 to employ a speed limiter.

NOC 101, through notification interface 105, is configurable and programmable to utilize a variety of different notification devices, the notification devices allowing communication with end users (e.g., notifying an end user that an alarm condition has been detected). In the preferred embodiment, NOC 101 automatically responds to a preprogrammed condition or occurrence (e.g., a detected alarm condition on a specific device 109), thereby not requiring human operator instructions or other human interaction. Accordingly, in the preferred embodiment, interface 105 is coupled to electronic mail (i.e., e-mail), facsimile, pager and/or standard telephonic devices. In order to utilize standard telephonic devices in the preferred automated system, interface 105 includes a voice synthesis system. Additionally interface 105 of the preferred embodiment is coupled to a public data network, such as the Internet, thus allowing notification messages to be sent by e-mail as well as through page updates on a secure, user-accessible WEB site.

User interface 103, coupled to NOC 101, allows end users to access and control the operation of NOC 101. In the preferred embodiment, interface 103 allows at least limited user/NOC communications without the need for a human operator. Preferably interface 103 is coupled to the Internet, thus allowing user access via e-mail and/or WEB site manipulation. Additionally, interface 103 can be coupled to a telephone system. In order to allow automated operation, the telephone system preferably includes a voice recognition system although a simple tone recognition system can also be used. Preferably system 100 is configured to allow users, through user interface 103, to obtain status information about a user item to which a device 109 is coupled (e.g., determine if the doors are locked), to enable/disable specific sensors 211, to control specific subsystems of the vehicle to which device 109 is attached (e.g., door locks), to reprogram aspects of device 109, to revise notification instructions, to revise contact information, to revise sensor alarm conditions, to obtain billing information, etc., all without the need for human operator assistance.

As previously disclosed, the present invention can utilize both wireless and wired communication channels. In the preferred embodiment, a wireless system is used in which the data flowing between NOC 101 and devices 109 (e.g., detected events, status checks, equipment control, etc.) is sent as data packets over existing cellular networks. In one preferred embodiment, network system 107 is comprised of the Aeris.net™ network and the data packets are sent using the Aeris.net™ MicroBurst® technology. It will be appreciated that other technologies can be used to send and receive the data packets of the present invention. For example, VBurst® technology can be used with the Aeris.net™. Alternately, the present invention can utilize the control channel of the AMPS analog cellular phone system for the communication link between remote devices 109 and NOC 101. Other alternate wireless communication systems include the GSM cell phone system which supports SMS (i.e., short message service) for the bi-directional delivery of data; the Mobitex™ data message delivery system offered in the Erricson and Bell South systems; the Ricochet™ brand of data transceivers offered by Metricom; and other cellular systems supporting such formats as the CDPD standard of wireless messaging. Satellite based wireless systems such as the ORBCOM™ system by Orbital Sciences Corporation can also be used to link remote devices 109 to NOC 101. Wired communication channels include analog phone lines, ISDN phone lines, T1 phone lines, and DSL phone lines. An alternate to any of the public carrier systems is a private data network.

As the above-identified communication systems are well known, including the preferred Aeris.net™ system, a detailed description of the required controllers, data routers, firmware, standardized protocols, etc. is not provided herein. It is understood, however, that transceiver 203 and controller 201 of each device 109 includes the necessary firmware/software to achieve compatibility with network 107 (e.g., receive, decode and execute instructions originating at NOC 101, code and transmit information for use by NOC 101, etc.).

In a typical network system such as the Aeris.net™ system used in the preferred embodiment, the data packets are sent over standard cellular control channels, thereby bypassing the voice channel. There are two types of control channels and message types: Forward Control Channels (FOCC) or downstream messages, which operate from the NOC 101 to a remote device 109, and Reverse Control Channels (RECC) or upstream messages, which operate from the remote device 109 back to NOC 101. In the preferred embodiment, each upstream message is comprised of a 15-digit word with each digit being comprised of a 4-bit nibble of range 1 to A (hex). Upstream messages are described in further detail in co-pending U.S. Pat. applications Ser. Nos. 09/347,389, filed Jul. 6, 1999, 09/547,270, filed Apr. 11, 2000, 09/547,272, filed Apr. 11, 2000, and 09/837,738, filed Apr. 17, 2001. These applications are incorporated herein by reference in their entirety for any and all purposes.

FOCC or downstream messages utilize data packets comprised of Mobile Identification Numbers (MINs). In a typical network system 107, such as the Aeris.net™ system, each remote device 109 along with the network system is designed to support a total of 11 MINs per device, a primary MIN and 10 secondary MINs. The secondary MINs, each of which are assigned to a specific remote device 109, can be used by NOC 101 to elicit various functions from the assigned remote device 109. As one of the secondary MINs is reserved for use by the network and the cellular system operator, there are a total of 9 secondary MINs available for use by NOC 101.

Table I below provides an example of possible uses for the secondary MINs in a system in which remote devices 109 are coupled to cars. It is understood that the indicated actions are only meant as examples: other instructional sets can be designed and implemented. Additionally it is understood that although the secondary MIN in Table I is abbreviated as a number from 1 to 10, in actuality the secondary MIN is comprised of a sequence of digits. Accordingly it is the sequence of digits that corresponds to the abbreviated secondary MIN to which a specific device 109 responds. Therefore even though every device 109 includes a fourth secondary MIN, secondary MIN #4 for one device 109 will be different from the secondary MIN #4 for every other device 109, thus allowing a specific device from a plurality of remote devices 109 to respond to the received secondary MIN.

TABLE I

| Secondary MIN | Action |
| --- | --- |
| 1 | Disarm the alarm system |
| 2 | Arm the alarm system |
| 3 | Unlock the doors |
| 4 | Lock the doors |
| 5 | Report vehicle location using on-board GPS system |
| 6 | Disable ignition switch |
| 7 | Sound horn, disable ignition switch, flash lights, start continuous GPS reporting |
| 8 | Initiate continuous GPS reporting |
| 9 | Send ACK (acknowledgement) in response to message from car |
| 10 | Reserved for Aeris net ™ use |

Figure 3:
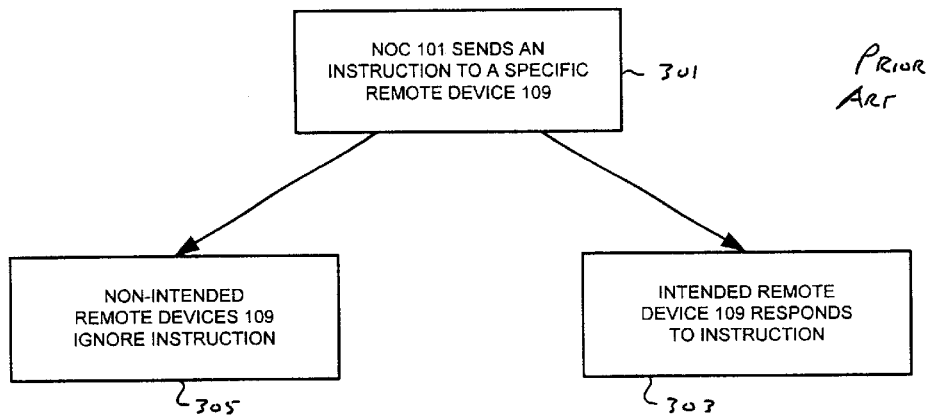
FIG. 3 illustrates the methodology associated with sending an action request utilizing Aeris.net™ or a similar system.

FIG. 3 illustrates the methodology associated with sending an action request utilizing Aeris.net™ or a similar system. Initially NOC 101 sends an instruction (step 301) via network 107 that all remote devices 109 receive. One remote device 109, the device that has been programmed to respond to the transmitted secondary MIN, responds (step 303) while the other remote devices 109 ignore the secondary MIN (step 305).

Figure 4:
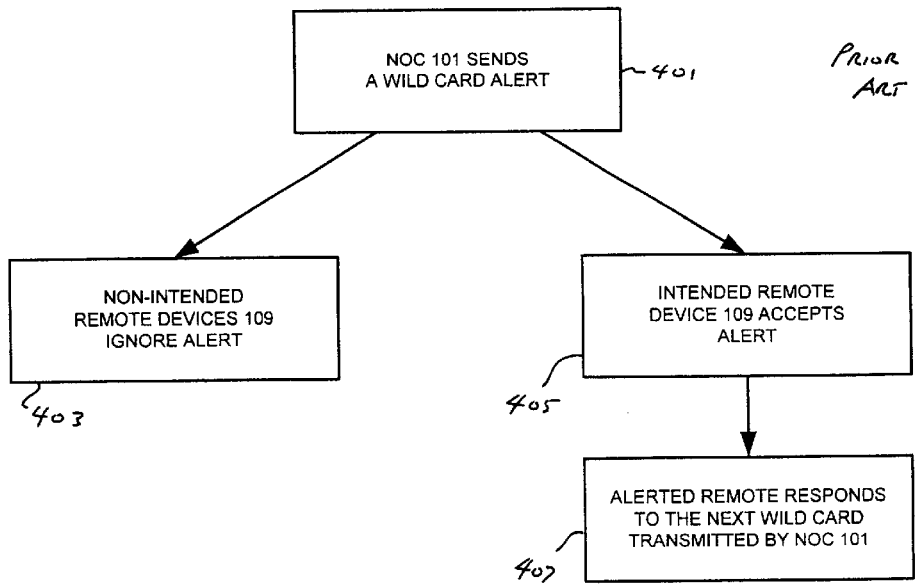
FIG. 4 illustrates the methodology associated with sending a wild card utilizing Aeris.net™ or a similar system.

Given the limitations imposed by having only 9 available secondary MINs, network system 107 provides a method of obtaining additional functionality for those users requiring such additional functionality. The method utilizes "wild card" MINs that the system user (e.g., NOC system operator) purchases, typically in blocks, from the network system operator. In this approach one of the secondary MINs for each remote device 109 is programmed as a wild card alert MIN. For example, as shown in Table II, secondary MIN 9 has been reserved as a wild card alert MIN. Thus when NOC 101 transmits a wild card alert (step 401 of FIG. 4), all remote devices 109 ignore the alert (step 403) except for the remote device with a secondary MIN matching that of the transmitted wild card alert (step 405). The alerted device then accepts the next wild card secondary MIN that NOC 101 transmits (step 407), thus not requiring a match between the transmitted action and any of the secondary MINs of the intended device 109.

TABLE II

| Secondary MIN | Action |
| --- | --- |
| 1 | Disarm the alarm system |
| 2 | Arm the alarm system |
| 3 | Unlock the doors |
| 4 | Lock the doors |
| 5 | Report vehicle location using on-board GPS system |
| 6 | Disable ignition switch |
| 7 | Sound horn, disable ignition switch, flash lights, start continuous GPS reporting |
| 8 | Initiate continuous GPS reporting |
| 9 | Wild card alert |
| 10 | Reserved for Aeris.net ™ use |

As a result of the wild card system of designating secondary MINs, a remote device 109 can respond to a virtually unlimited number of secondary MINs even though it may recognize a significantly fewer number of secondary MINs (e.g., 8 user programmed actions plus the wild card alert secondary MIN). There are several advantages to this approach. First, it allows a remote device to respond to hundreds of secondary MINs, and thus NOC initiated instructions, while recognizing a very limited number of secondary MINs. Second, network system 107 does not need to expend resources (e.g., system memory) for end users that do not require a greater instructional set than that allowed for by the base set (e.g., recognition of 9 user-specified secondary MINs with the Aeris.net™ system). Third, the complexity of remote devices 109 can be they only need the ability to recognize a very limited number of secondary primary disadvantage of this approach is that the system operator (e.g., NOC 101) must purchase a block of wild cards, thus significantly adding to system operating costs can be especially problematic in many systems in which the additional instructions/actions allowed by the use of the wild cards are infrequently required or if the system operator only needs to supply a few additional instructions/actions.

In an alternate method of expanding the functionality of a network system such as Aeris.net™, the present invention assigns one or more secondary MINs as a Command Sequence Trigger or CST. One or more CSTs can be used to dramatically multiple the number of instructions/actions that can be transmitted by NOC 101 to a designated device 109 without requiring the purchase of wild cards from network operator 107.

Figure 5:
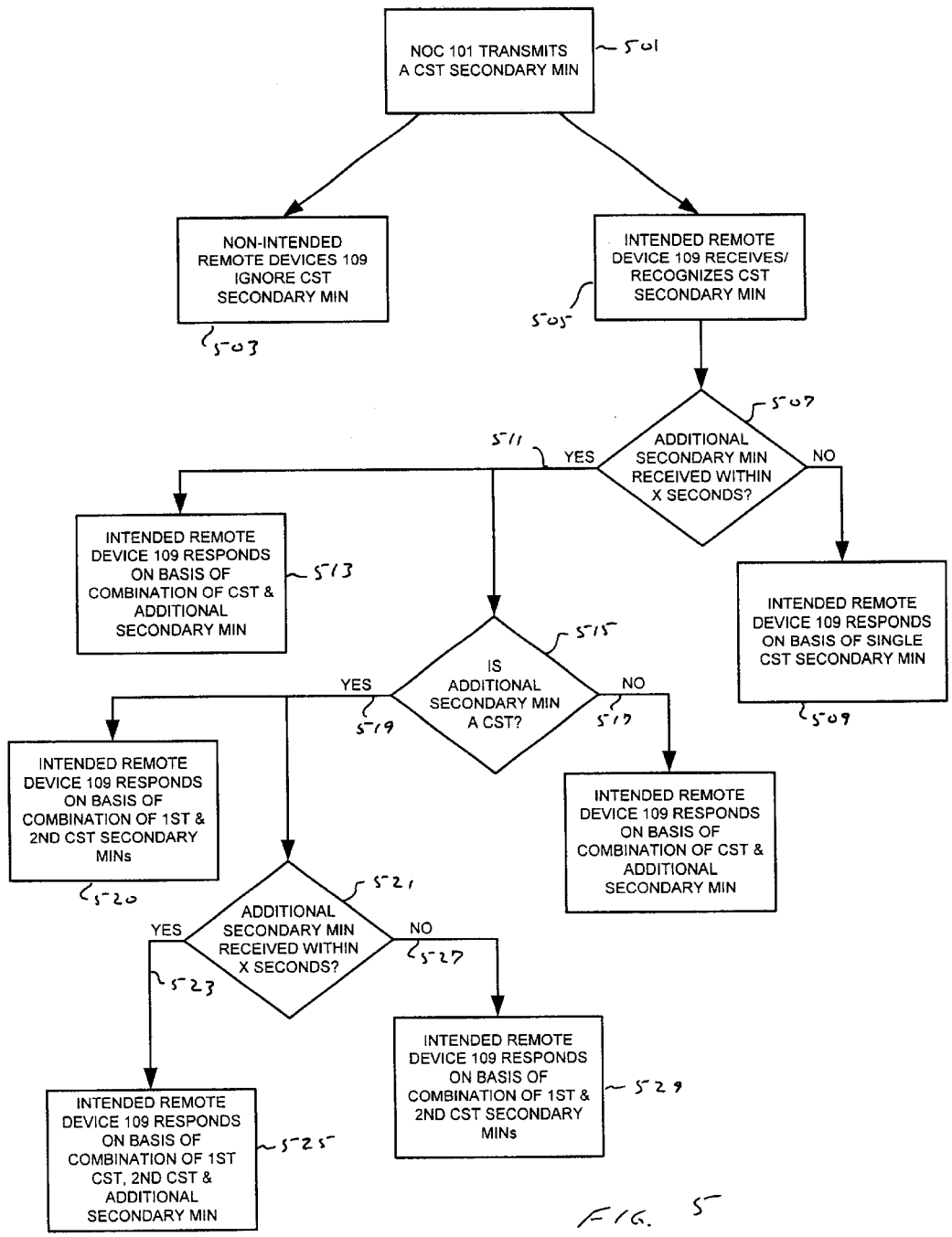
FIG. 5 illustrates an embodiment of the invention in which the functionality of the network system is expanded by assigning one or more secondary MINs as Command Sequence Triggers or CSTs.

In use, and as illustrated in FIG. 5, NOC 101 initially transmits a CST to a designated remote device 109 (step 501). The CST secondary MIN is ignored by all non-intended remote devices 109 (step 503). The intended remote device 109 recognizes the transmitted CST secondary MIN and initiates a timer (step 505). If the designated remote device 109 does not receive an additional secondary MIN within a predetermined time period (step 507), it responds to the CST secondary MIN as preprogrammed (step 509). In the preferred embodiment of the invention, the predetermined time period is 60 seconds although it is understood that this time period can be shorter or longer without departing from the invention. If no additional secondary MIN is received within the allotted time, the designated device can be programmed to simply ignore the CST secondary MIN or to perform a specific action (e.g., activate the horn, send a request for additional instructions to NOC 101, etc.). If an additional secondary MIN is received within the allotted time (step 511), the designated remote device performs the action corresponding to the combination of the CST secondary MIN and the additional secondary MIN (step 513). Alternately, remote device 109 can be programmed to determine if the additional secondary MIN is another CST secondary MIN (step 515). If the additional secondary MIN is not another CST secondary MIN (step 517), then the device performs the action corresponding to the combination of the CST secondary MIN and the additional secondary MIN (step 518). If the additional secondary MIN is another CST (step 519), then the device can either respond on the basis of the combination of the first and second CST secondary MINs (step 520) or, in an alternate embodiment, initiate the timer and begin waiting for receipt of another secondary MIN (step 521). If an additional secondary MIN is received within the allotted time (step 523), the designated remote device performs the action corresponding to the combination of the first CST instruction, the second CST instruction, and the additional secondary MIN (step 525). If no additional secondary MIN is received within the allotted time (step 527), the designated remote device performs the action corresponding to the combination of the first and second received CST secondary MINs (step 529). In the embodiment illustrated in FIG. 5, the system is limited to a total of three secondary MINs. Thus even if all three secondary MINs are CSTs (e.g., 9, 8, 9), the system would not wait to determine if an additional secondary MIN will be received after receipt of the third CST before responding. It is understood, however, that this limitation is an artificial limitation used to limit the response delay of remote device 109. The same system could be configured to enter the waiting loop (i.e., steps 507 or 521 of FIG. 5) every time that the received secondary MIN is a CST. In the above example, this configuration would allow the device to respond to the receipt of secondary MINs such as 8, 9, 9, 8, 8, 1. Additionally it should be understood that although FIG. 5 only illustrates the use of two CST secondary MINs, the system can be programmed to permit the designation of more than two CST secondary MINs, thus adding further flexibility to the system.

Table III illustrates the use of CSTs according to an embodiment of the present invention. It is understood that the instructions/actions provided are only meant as examples of possible actions and that different actions as well as fewer/greater numbers of CSTs or fewer/greater numbers of total allowed secondary MINs can be utilized without departing from the invention.

TABLE III

| Secondary MIN | Action |
|---|---|
| 1 | Disarm the alarm system |
| 2 | Arm the alarm system |
| 3 | Unlock the doors |
| 4 | Lock the doors |
| 5 | Report vehicle location using on-board GPS system |
| 6 | Disable ignition switch |
| 7 | Sound horn, disable ignition switch, flash lights, start continuous GPS reporting |
| 8 | CST - If no additional secondary MINs received within allotted time, lower windows |
| 9 | CST - If no additional secondary MINs received within allotted time, raise windows |
| 10 | Reserved for Aeris.net ™ use |
| 8 + 1 | Activate mobile phone |
| 8 + 2 | Deactivate mobile phone |
| 8 + 3 | Raise convertible roof |
| 8 + 4 | Lower convertible roof |
| 8 + 5 | Close sun-roof |
| 8 + 6 | Open sun-roof |
| 8 + 7 | Activate speed monitor |
| 8 + 8 | Activate speed monitor and report if the speed exceeds 40 mph |
| 8 + 9 | Activate speed monitor and report if the speed exceeds 50 mph |
| 9 + 1 | Activate speed monitor and report if the speed exceeds 60 mph |
| 9 + 2 | Activate speed monitor and report if the speed exceeds 70 mph |
| 9 + 3 | Activate speed monitor and report if the speed exceeds 80 mph |
| 9 + 4 | Activate speed monitor and report if the speed exceeds 90 mph |
| 9 + 5 | Activate speed monitor and report vehicle location when speed exceeds 40 mph. Continue to report location every 5 minutes until speed drops below 40 mph. |
| 9 + 6 | Activate speed monitor and report vehicle location when speed exceeds 50 mph. Continue to report location every 5 minutes until speed drops below 50 mph. |
| 9 + 7 | Activate speed monitor and report vehicle location when speed exceeds 60 mph. Continue to report location every 5 minutes until speed drops below 60 mph. |
| 9 + 8 | Activate speed monitor and report vehicle location when speed exceeds 70 mph. Continue to report location every 5 minutes until speed drops below 70 mph. |
| 9 + 9 | Activate speed monitor and report vehicle location when speed exceeds 80 mph. Continue to report location every 5 minutes until speed drops below 80 mph. |
| 8 + 8 + 1 | Initiate continuous GPS monitoring, report location every 1 minute |

TABLE III-continued

| Secondary MIN | Action |
| --- | --- |
| 8 + 8 + 2 | Initiate continuous GPS monitoring, report location every 2 minutes |
| 8 + 8 + 3 | Initiate continuous GPS monitoring, report location every 3 minutes |
| 8 + 8 + 4 | Initiate continuous GPS monitoring, report location every 5 minutes |
| 8 + 8 + 5 | Initiate continuous GPS monitoring, report location every 10 minutes |
| 8 + 8 + 6 | Initiate continuous GPS monitoring, report location every 15 minutes |
| 8 + 8 + 7 | Initiate continuous GPS monitoring, report location every 20 minutes |
| 8 + 8 + 8 | Initiate continuous GPS monitoring, report location every 30 minutes |
| 8 + 8 + 9 | Initiate continuous GPS monitoring, report location every 45 minutes |
| 8 + 9 + 1 | Initiate continuous GPS monitoring, report location every 60 minutes |
| 8 + 9 + 2 | Initiate continuous GPS monitoring, report location every 120 minutes |
| 8 + 9 + 3 | Initiate continuous GPS monitoring, report location every 180 minutes |
| 8 + 9 + 4 | Initiate continuous GPS monitoring, report location every 240 minutes |
| 8 + 9 + 5 | Activate location monitor and report if vehicle goes further than 0.1 miles from present location |
| 8 + 9 + 6 | Activate location monitor and report if vehicle goes further than 0.25 miles from present location |
| 8 + 9 + 7 | Activate location monitor and report if vehicle goes further than 0.5 miles from present location |
| 8 + 9 + 8 | Activate location monitor and report if vehicle goes further than 1 mile from present location |
| 8 + 9 + 9 | Activate location monitor and report if vehicle goes further than 5 miles from present location |
| 9 + 8 + 1 | Activate location monitor and report if vehicle goes further than 10 miles from present location |
| 9 + 8 + 2 | Activate location monitor and report if vehicle goes further than 20 miles from present location |
| 9 + 8 + 3 | Activate location monitor and report if vehicle goes further than 30 mile from present location |
| 9 + 8 + 4 | Activate location monitor and report if vehicle goes further than 40 miles from present location |
| 9 + 8 + 5 | Activate location monitor and report if vehicle goes further than 50 miles from present location |
| 9 + 8 + 6 | Activate location monitor and report if vehicle goes further than 75 miles from present location |
| 9 + 8 + 7 | Activate location monitor and report if vehicle goes further than 100 mile from present location |
| 9 + 8 + 8 | Activate location monitor and report if vehicle goes further than 250 miles from present location |
| 9 + 8 + 9 | Activate location monitor and report if vehicle goes further than 500 miles from present location |
| 9 + 9 + 1 | Activate location monitor and report if vehicle goes further than 750 miles from present location |
| 9 + 9 + 2 | Activate location monitor and report if vehicle goes further than 1000 miles from present location |
| 9 + 9 + 3 | Report vehicle status using OBD system |
| 9 + 9 + 4 | Flash lights and pulse horn for 10 seconds (to help locate car in parking lot) |
| 9 + 9 + 5 | Flash lights and pulse horn for 30 seconds (to help locate car in parking lot) |
| 9 + 9 + 6 | Activate on-board cell phone and call preset number to allow passenger compartment monitoring |
| 9 + 9 + 7 | Pulse horn, flash lights, start continuous GPS reporting |
| 9 + 9 + 8 | Activate seat pressure sensors |
| 9 + 9 + 9 | Acknowledge NOC instruction receipt |

As illustrated by the example of Table III, in at least one preferred embodiment of the invention, the order that secondary MINs, including CSTs, are received by a device 109 will determine the course of action. Thus in the above example the receipt of secondary MINs in the order 9, 8, and then 2 will result in the intended device 109 performing a different action than the receipt of the same secondary MINs in the order 8, 9, and then 2.

In an alternate embodiment, the CST secondary MINs are not combinable with any non-CST secondary MINs. Preferably the number of CST secondary MINs that can be received by a remote device 109 is limited. Thus, for example, in the embodiment shown in FIG. 6, the system is configured to require the receipt of three CST secondary MINs before responding. The invention can also be configured to require either fewer or greater numbers of CST secondary MINs.

As illustrated, after the intended remote device 109 receives a first CST secondary MIN (step 505), it initiates a timer (step 601). Assuming that the system has been configured as described, if no additional CST secondary MINs are received within the allotted time (step 603), the system resets (step 605). If a second CST secondary MIN is received (step 607), the system restarts the timer with the same or different amount of time allotted for response (step 609). If a third CST secondary is not received within the allotted time (step 611), the system resets, otherwise the remote device 109 responds on the basis of the combination of the three CST secondary MINs. Table IV indicates the possible secondary MIN combinations along with exemplar instructions/actions for this embodiment

TABLE IV

| Secondary MIN | Action |
| --- | --- |
| 1 | Disarm the alarm system |
| 2 | Arm the alarm system |
| 3 | Unlock the doors |
| 4 | Lock the doors |
| 5 | Report vehicle location using on-board GPS system |
| 6 | Disable ignition switch |
| 7 | Sound horn, disable ignition switch, flash lights, start continuous GPS reporting |
| 8 | CST |
| 9 | CST |
| 10 | Reserved for Aeris.net ™ use |
| 8 + 8 + 8 | Activate mobile phone |
| 8 + 8 + 9 | Deactivate mobile phone |
| 8 + 9 + 8 | Report vehicle status using OBD system |
| 8 + 9 + 9 | Flash lights and pulse horn for 10 seconds (to help locate car in parking lot) |
| 9 + 8 + 8 | Initiate continuous GPS monitoring, report location every 5 minutes |
| 9 + 8 + 9 | Activate location monitor and report if vehicle goes further than 1 mile from present location |
| 9 + 9 + 8 | Activate speed monitor and report if the speed exceeds 40 mph |
| 9 + 9 + 9 | Activate speed monitor and report vehicle location when speed exceeds 40 mph. Continue to report location every 5 minutes until speed drops below 40 mph. |

In an alternate embodiment, rather than resetting the device if additional CST secondary MINs are not received (i.e., steps 603 and 611), the device can be configured to respond on the basis of the CST secondary MINs received. Thus in the above example, after step 603 the remote device would respond on the basis of the single received CST secondary MIN. Similarly, after step 611 the remote device would respond on the basis of the first and second CST secondary MINs.

Figure 7:
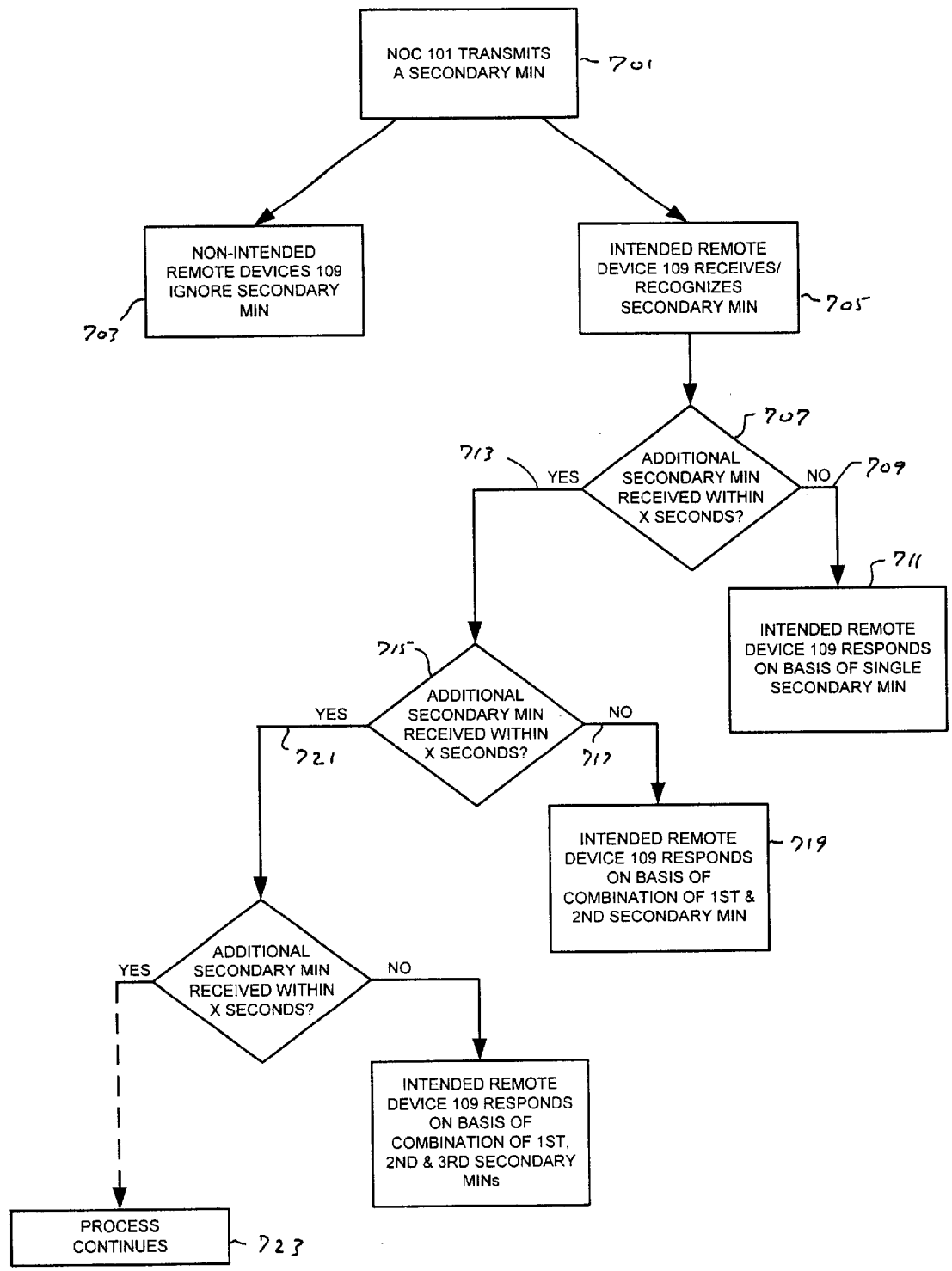
FIG. 7 illustrates an embodiment of the invention in which every secondary MIN is treated as a CST secondary MIN.

In an alternate embodiment, every secondary MIN is treated as a CST secondary MIN. As illustrated in FIG. 7, in this embodiment as in the prior embodiment, after NOC 101 transmits a secondary MIN (step 701), all non-intended remote devices 109 ignore the transmitted secondary MIN (step 703) while the intended remote device 109 recognizes and accepts the secondary MIN (step 705). The intended remote device 109 then initiates a timer and, for a preset time (e.g., 60 seconds), waits for the receipt of an additional secondary MIN (step 707). If the intended remote device 109 does not receive an additional secondary MIN within the preset time period, (step 709), it treats the initial secondary MIN as a single secondary MIN and responds accordingly (step 711). If an additional secondary MIN is received within the allotted time (step 713), the intended remote device restarts the timer utilizing either the same or a different time period and again waits for the receipt of an additional secondary MIN (715). If an additional secondary MIN is not received within the time period (step 717), the intended remote device 109 performs the action that corresponds to the combination of the first and second received secondary MINs (step 719). If an additional secondary MIN is received within the allotted time (step 721), then the process of waiting for additional secondary MINs and responding depending upon whether or not additional secondary MINs are received starts over.

Preferably the process illustrated in FIG. 7 is only permitted a specific number of iterations, thus limiting the possible delay associated with the waiting steps (e.g., steps 707 and 715 of FIG. 7). Accordingly, the system could be limited to only accepting a combination of two secondary MINs, three secondary MINs, etc., before responding. Alternately, and as illustrated in FIG. 7 with step 723, the process can be permitted to run indefinitely, thus allowing for any combination of all of the user assignable secondary MINs. The system can be configured to permit the same secondary MIN to be used only once in a single sequence or to be used more than once, thus allowing an infinite number of instructional sequences to be transmitted, assuming the number of waiting steps is not limited. As noted in the prior embodiment, preferably the order in which secondary MINs are received is used to distinguish specific requested actions. Accordingly, the receipt of secondary MINs 2, 4, 7 in that order will result in the designated remote device 109 performing a different instruction than if the same secondary MINs are received in the order 2, 7, 4; 4, 2, 7; 4, 7, 2; etc.

Figure 6:
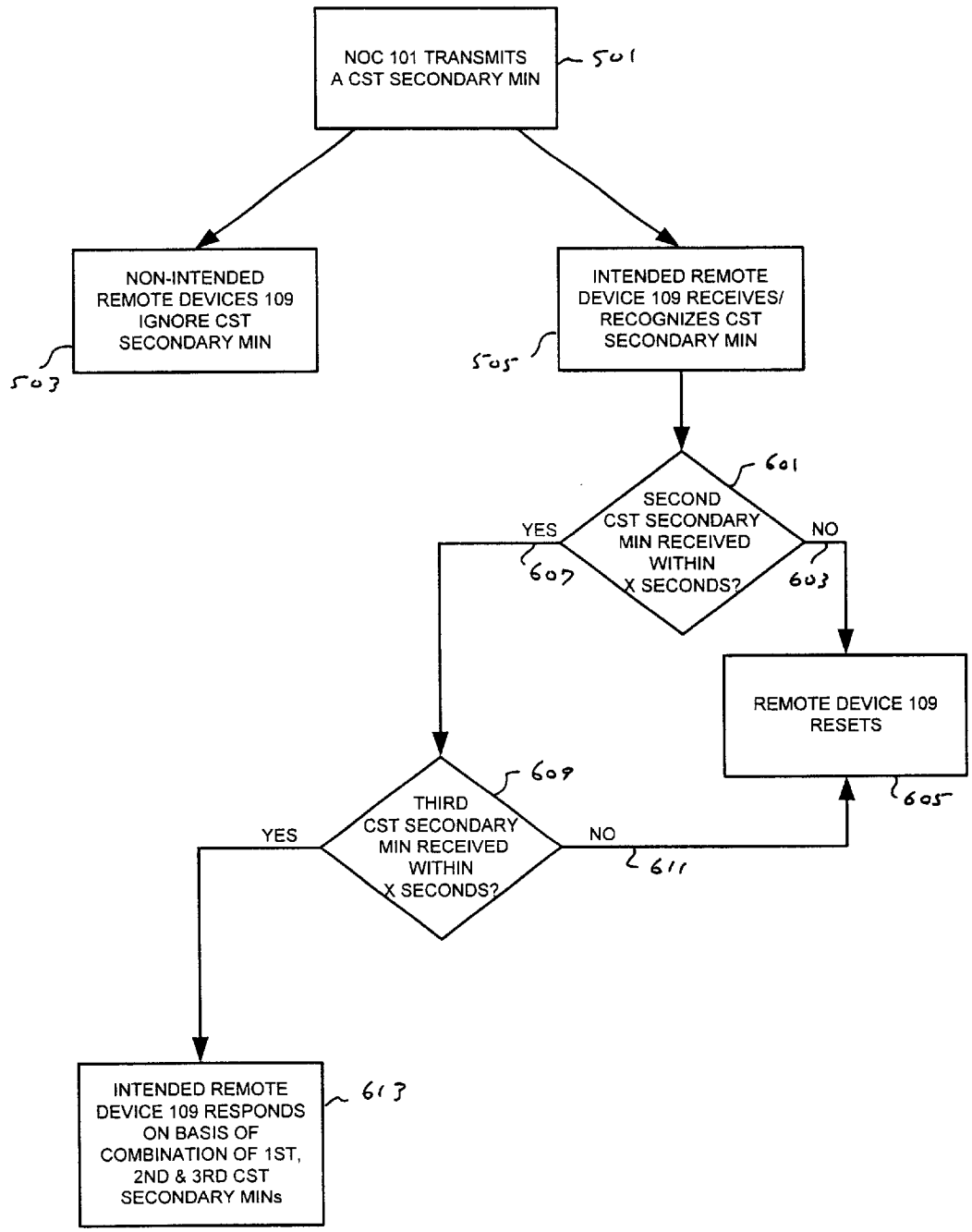
FIG. 6 illustrates an embodiment of the invention in which CST secondary MINs are not combinable with non-CST secondary MINs.
Figure 8:
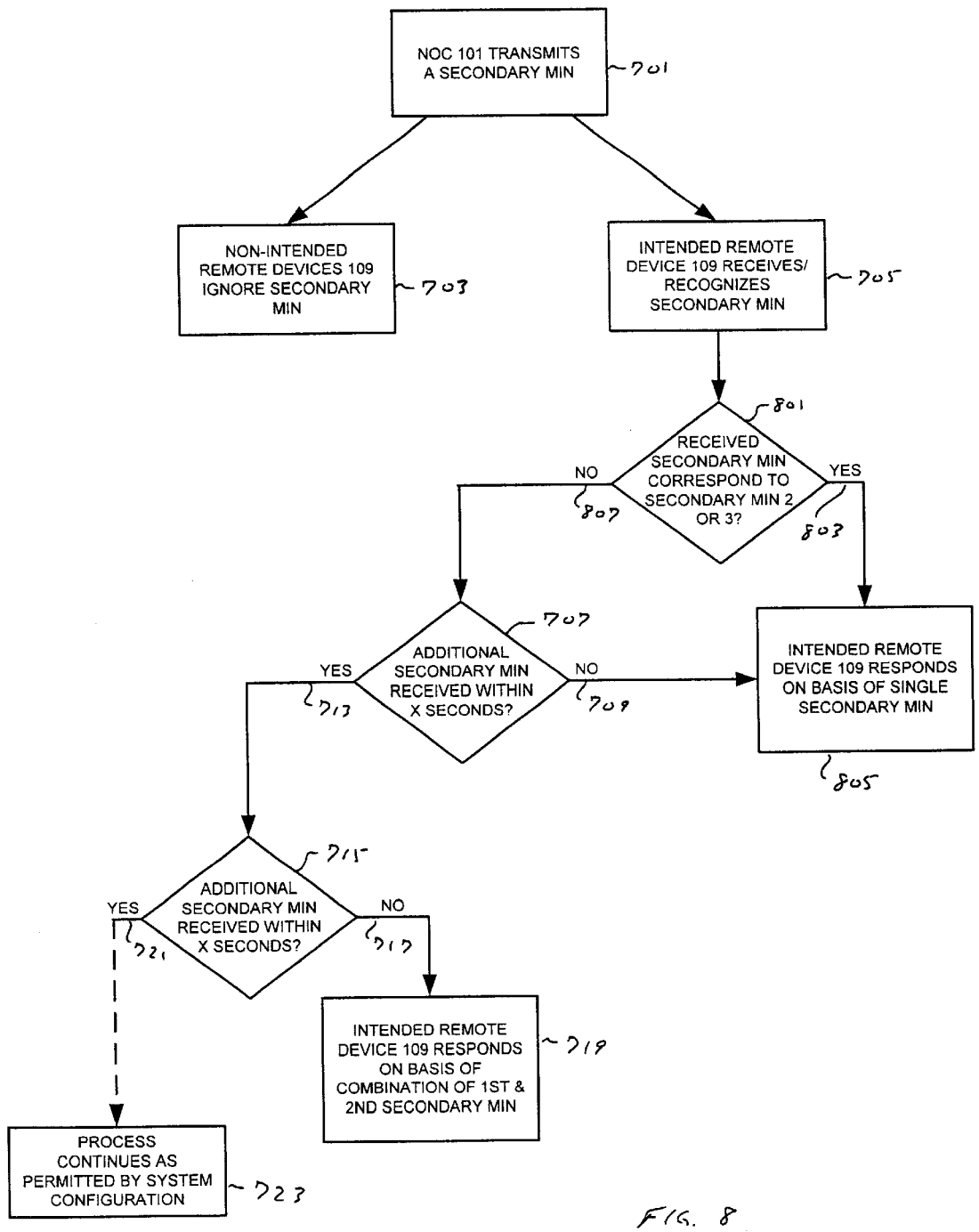
FIG. 8 illustrates an embodiment of the invention in which at least one secondary MIN is reserved for immediate response.

Although the embodiment illustrated in FIG. 7 allows for a larger instructional set than the embodiment illustrated in FIGS. 5 or 6, the disadvantage of this approach is that no instruction is immediately performed since the system always enters into the timer mode after receipt of a secondary MIN. Thus, for example, after the intended remote device 109 receives the first secondary MIN in step 705, before responding it first waits to determine if a second secondary MIN will be received. Even though the delay is short, depending upon the timer setting, the delay may still be longer than desired under certain conditions (e.g., car theft). Accordingly, in an alternate embodiment, at least one secondary MIN is reserved for immediate response. For example, as illustrated in FIG. 8 and assuming that secondary MINs 2 and 3 have been reserved for immediate response, after the intended remote device 109 receives a secondary MIN (step 705), it then determines if the received secondary MIN is one requiring immediate attention, i.e., secondary MIN 2 or 3 (step 801). If the received secondary MIN corresponds to one requiring immediate attention (step 803), remote device 109 acts immediately on the basis of the received secondary MIN (step 805). If the received secondary MIN does not correspond to one requiring immediate attention (step 807), then the system begins the process of waiting for additional secondary MINs and responding according to whether or not additional secondary MINs are received as described above in reference to FIG. 7.

Depending upon how many instructions/actions remote device 109 must be capable of responding to, limiting the number of additional secondary MINs a remote device 109 will accept can accelerate the process in accordance with any of the preceding embodiments. For example, the system can be configured to require a remote device 109 to act immediately upon receipt of a second secondary MIN, thus limiting the delay to the time allotted for waiting for receipt of the second secondary MIN after receipt of the initial secondary MIN. Accordingly, after step 511 of FIG. 5 or step 713 of either FIG. 7 or FIG. 8, the remote device would immediately respond rather than entering into an additional waiting period as illustrated.

In at least one embodiment of the invention, when a remote device 109 receives a secondary MIN it responds with an acknowledgement (ACK) message. If NOC 101 does not receive the appropriate ACK message it responds in accordance with the system programming, typically by resending the secondary MIN until either the secondary MIN is successfully received or until the secondary MIN has been transmitted a predetermined number of times (e.g., 3 times). In at least one other embodiment of the invention, remote device 109 does not send an ACK message until all expected secondary MINs have been successfully received. For example, in the embodiment illustrated in FIG. 6, preferably the intended remote device 109 will not send an ACK message until it has received all three CST secondary messages.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of interpreting secondary Mobile Identification Numbers (MINs), the method comprising the steps of:

accepting a first secondary MIN by an intended remote device, wherein said intended remote device is one of a plurality of remote devices capable of receiving said first secondary MIN, wherein said first secondary MIN is one of a plurality of secondary MINs uniquely identifying said intended remote device and distinguishing said intended remote device from said plurality of remote devices;

determining if said first secondary MIN is a first Command Sequence Trigger (CST) secondary MIN;

responding to said first secondary MIN if said first secondary MIN is determined not to be said first CST secondary MIN;

initializing a timer if said first secondary MIN is determined to be said first CST secondary MIN;

accepting a second secondary MIN by said intended remote device if said second secondary MIN is received by said intended remote device within a preset time period as determined by said timer and if said first secondary MIN is determined to be said first CST secondary MIN, wherein said second secondary MIN is one of said plurality of secondary MINs uniquely identifying said intended remote device and distinguishing said intended remote device from said plurality of remote devices; and performing a first pre-assigned response, wherein said first pre-assigned response corresponds to the acceptance of both said first and said second secondary MINs by said intended remote device.

2. The method of claim 1, wherein said first pre-assigned response is comprised of transmitting a status of at least one monitored condition of a user device coupled to said intended remote device to said network operations center.

3. The method of claim 1, wherein said first pre-assigned response is comprised of transmitting a set of position coordinates to said network operations center, wherein said set of position coordinates correspond to a user device coupled to said intended remote device.

4. The method of claim 1, wherein said first pre-assigned response is comprised of instructing a device controller coupled to said intended remote device to perform a pre-defined function.

5. The method of claim 1, wherein said first pre-assigned response is comprised of transmitting an acknowledgement message to said network operations center.

6. The method of claim 1, wherein said first pre-assigned response is comprised of:

determining if said second secondary MIN is a second CST secondary MIN;

performing a second pre-assigned response if said second secondary MIN is determined not to be said second CST secondary MIN;

initializing said timer if said second secondary MIN is determined to be said second CST secondary MIN;

accepting a third secondary MIN by said intended remote device if said third secondary MIN is received by said intended remote device within a second preset time period as determined by said timer and if said second secondary MIN is determined to be said second CST secondary MIN, wherein said third secondary MIN is one of said plurality of secondary MINs uniquely identifying said intended remote device and distinguishing said intended remote device from said plurality of remote devices; and performing a third pre-assigned response, wherein said third pre-assigned response corresponds to the acceptance of said first, second and third secondary MINs by said intended remote device.

7. The method of claim 6, wherein said second pre-assigned response corresponds to resetting said intended remote device.

* * * * *